United States Patent [19]
Williams, Jr.

[11] 3,977,086
[45] Aug. 31, 1976

[54] RANGE ESTIMATING DEVICE FOR GOLFERS

[76] Inventor: Albert J. Williams, Jr., 901 Llanfair Road, Ambler, Pa. 19002

[22] Filed: May 8, 1975

[21] Appl. No.: 575,733

[52] U.S. Cl. ................................. 33/277; 33/262
[51] Int. Cl.² ........................................... G01C 3/00
[58] Field of Search ............... 33/277, 262, 265; 224/5 R

[56] References Cited
UNITED STATES PATENTS

| | | | |
|---|---|---|---|
| 1,363,670 | 12/1920 | Parker et al. | 33/277 |
| 2,519,727 | 8/1950 | Yezdan | 33/277 |
| 2,574,599 | 11/1951 | Stieber | 33/265 |
| 3,251,571 | 5/1966 | Ernest | 224/5 R |
| 3,409,987 | 11/1968 | New | 33/277 |
| 3,824,698 | 7/1974 | Brucker | 33/277 |
| 3,846,918 | 11/1974 | Wehlan | 33/277 |

FOREIGN PATENTS OR APPLICATIONS

| | | | |
|---|---|---|---|
| 617,283 | 8/1935 | Germany | 33/277 |
| 44,832 | 6/1961 | Poland | 33/277 |

Primary Examiner—Samuel B. Rothberg
Attorney, Agent, or Firm—Woodcock Washburn Kurtz & MacKiewicz

[57] ABSTRACT

Apparatus for estimating the range of a golf course flagstick in terms of a number of paces which is common to all users. An opaque body adapted to be held in the hand is so shaped that its profile has two parallel ridges which face in the same direction, are separated by 47/64 inch, and lie on the same side of a perpendicular line along which they terminate. In use, the apparatus is held at arm's length so that the ridges are horizontal and the lower ridge is aligned with the lowermost visible extremity of the flagstick. In the special case when the upper ridge is found to be in line with the uppermost end of the flagstick the observer is 100 paces from the flagstick. In the general case the distance to the flagstick in relation to 100 of the user's paces then consists in the ratio of the observed distance between the ridges to the observed height of the flagstick.

In one embodiment the ridges are comprised by the elevational profiles of a pair of spaced annular elements, the elements being separated by a stem of reduced diameter, a second stem element depending from one of the annular elements so that it may be easily grasped by a user.

1 Claim, 8 Drawing Figures

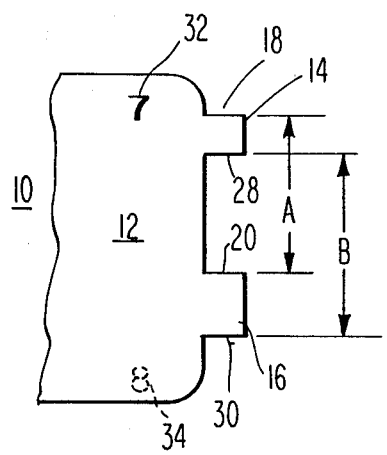
Fig. 1
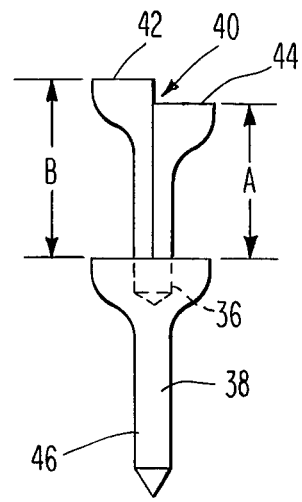
Fig. 5
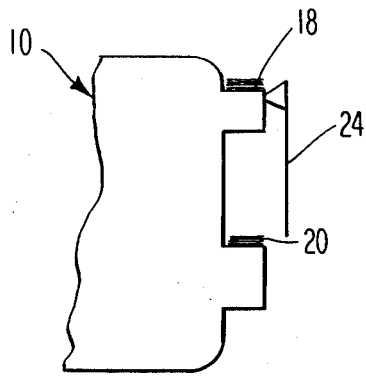
Fig. 3
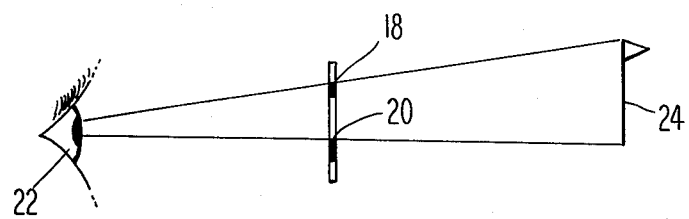
Fig. 2
Fig. 7
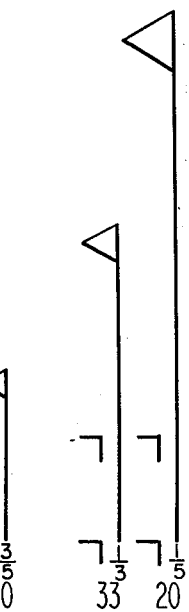
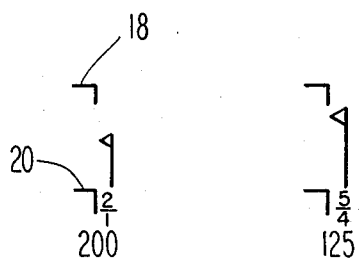

RANGE ESTIMATING DEVICE FOR GOLFERS

BACKGROUND OF THE INVENTION

The present invention relates to geometrical instruments, and more particularly to a hand-held sighting device for estimating distance in terms of the actual paces of an observer.

In day-to-day life an individual is repeatedly required to estimate distances. Most such estimations are of a casual nature, i.e., not requiring any particular degree of precision. Other estimates, such as those made while operating a motor vehicle, may be of crucial importance. However, at least in the example of the motor vehicle the continuous control afforded by the operator allows initial estimates to be compensated for and refined as the vehicle accelerates, is brought to a stop, or is maneuvered to avoid an obstacle. Other estimations, however, are made with respect to activities which cannot be continuously controlled. Such activities, such as throwing a ball, firing a gun, or shooting an arrow all depend upon the accuracy of the aim of the actor. In the case of firearms, considerable effort has gone into the design of sophisticated sighting mechanisms to allow a manually-held firearm to be "sighted in" on a distant object, while compensating for the ballistic trajectory of the missile to be fired. However, in other areas, particularly those involving sporting activities, less attention has been given to the construction of useful sighting devices. This is partially for the reason that the ability to estimate distances has probably been regarded as one of the inherent attributes of a successful athlete. The accurate estimate of long distances, however, requires considerable practice and consistent use which is not always possible for the casual participant.

Further, it is well known that human distance estimation relies principally upon the stereoscopic effect arising from the very slight inward turning of the eyes necessary to train them upon an object. The degree of convergence of the lines of sight of the eyes is thus a function of the distance to the object of interest. The human brain learns at an early age to automatically recognize this effect, and to thus provide an automatic estimation of distance. It is apparent, however, that individuals who suffer from even minor visual handicaps may be seriously penalized in their ability to estimate distance although they may be quite proficient with regard to other aspects of a sport.

Particularly in the game of golf it is necessary that one be able to judge long distances in order to determine how hard to strike a golf ball. Even in the case of an individual who has unusually good eyesight, the distances involved on a golf course are substantially greater than those normally involved in day-to-day distance estimations so that the occasional golfer can neither develop nor maintain an ability to judge such distances accurately.

For the foregoing reasons, it is apparent that there is a need on the part of golf participants for an easily-manipulated device for estimating distances, particularly to the flagstick which marks the location of each successive hole in a round of golf. Some devices, such as optical range finders, are presently being marketed and perform satisfactorily. However these devices suffer from the dual disability of being expensive, and of representing distance in objective rather than subjective units. To be more explicit, such a range finder is intended for use by practically anyone and is designed to provide an indication of distance in fixed units such as feet, yards, meters, etc. Most individuals, however, simply have not had sufficient experience with fixed units of measure to have a subjective perception of the meaning of a distance expressed in such units. Many individuals, for instance, are able to estimate a distance of 100 yards only by associating it with the length of a football field since common experience allows these individuals to subjectively "know" the length of such a field. Particular individuals, depending upon their experience, may be able to estimate particular distances by relating them to the width of a lawn, the distance between a pair of familar objects, etc. Such estimations, however, can only be made for particular distances.

The problem discussed above also arises in archery wherein a distance must be properly estimated in order to allow the archer to gauge the drop of an arrow in flight and compensate for it. To this end, a number of sighting devices have been developed for use in connection with the sport of archery. For instance, in U.S. Pat. No. 2,574,599 - Stieber a particular sighting device is shown which includes a series of notches or openings of varying widths. The widths of a properly-sized opening is aligned with a distant bulls-eye target which is of a known, standard diameter. The openings provided in the sights are graduated from top to bottom in decreasing order of width so that the further away the target, the higher the bow must be raised in order to align an appropriate opening with the bulls-eye. As a consequence of the raising of the bow, the attitude of the arrow is increased to compensate for its "drop" in flight which is in turn a function of distance from the target. The Stieber device is therefore actually a sighting compensation device rather than a distance estimation means.

As shown in the Stieber patent, numbers indicating the absolute distance (in yards) from the target can be associated with various openings. This does not, however, allow a user to subjectively relate his activity to the distance involved, and moreover requires the use of either a plurality of openings or a single elongate opening of tapering width. In view of the foregoing, it will be understood that it would be advantageous to provide a device for estimating distances in terms of a known number of an individual's own paces, and to do so by means of a simple apparatus which is of a common size for all individuals.

It is therefore an object of the present invention to provide an improved hand-held distance estimating device.

It is another object of the present invention to provide means for determining the distance to an observed golf flagstick in terms of an observer's own paces.

A still further object of the invention is to provide a simple and economical hand-held means for signifying when one is a fixed number of paces from a golf flagstick.

BRIEF DESCRIPTION OF THE DRAWINGS

While the specification concludes with claims particularly pointing out and distinctly claiming the subject matter which is regarded as the invention, it is believed that the invention will be better understood from the following description of a preferred embodiment taken in conjunction with the accompanying drawings in which:

FIG. 1 is an illustration of one presently preferred embodiment of the present invention;

FIG. 2 depicts the geometrical relationships involved in the use of the present invention;

FIG. 3 illustrates a compensating aspect which arises as a result of the specific construction of the invention;

FIG. 5 depicts another form of a preferred embodiment;

FIG. 7 is a graphical representation useful in understanding some basic relationships involved in the use of the present invention.

SUMMARY OF THE INVENTION

Figure 4:
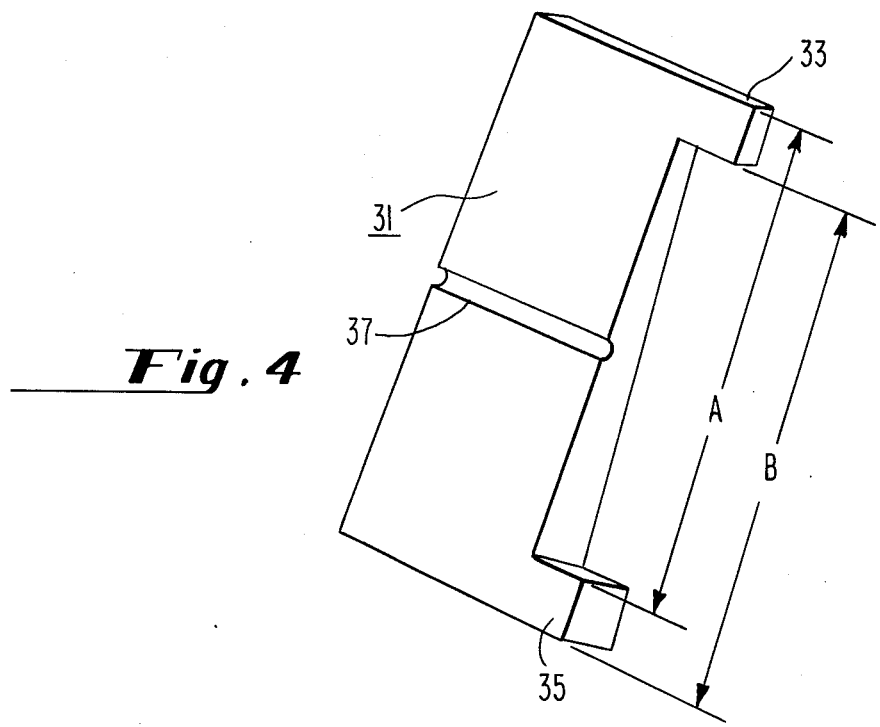
FIG. 4 shows another form of the invention, adapted to be easily retained when not in use.

An opaque element adapted to be held at arm's length is so shaped to present a profile having two parallel ridges facing in the same direction and separated by 47/64 inch. In use the ridges extend horizontally, one above the other, to terminate at a common vertical line.

In one presently preferred embodiment, the device comprises a relatively thin planar element which is substantially opaque, while in another embodiment the ridges are formed by the silhouette or profile of the upper edges of a pair of spaced lands formed in an elongate rod-like element having a depending shank portion which may be grasped by the user.

When held at arm's length, and with the lower ridge of the device aligned with the lowermost visible portion of a seven foot golf flagstick, the upper ridge will align with the uppermost portion of the flagstick when the observer is just 100 of his own paces from the stick. Estimations of other relative distances may be made by considering the apparent height of the flagstick to represent 100 of the user's paces in which case the distance between the ridges will represent the actual number of paces to the flagstick.

DESCRIPTION OF A PREFERRED EMBODIMENT

FIG. 1 shows, in partially cutaway form, one presently preferred embodiment of the invention which comprises a body 10 of an opaque or substantially opaque material. Body 10 is advantageously of comparatively small size so that it may be easily held in the fingers of one hand. While it may be made of any suitable material, such as paper, cardboard, metal, wood or plastic, the last three materials are preferred over the former inasmuch as they are less likely to be torn or deformed.

Extending from one side of the body 12 are an upper and a lower projection 14 and 16, respectively. Each projection is provided with a topside edge or ridge 18, 20 which is substantially straight. The ridges are parallel to one another, and the distal ends thereof terminate along a common line which is normal to both of the ridges. The ridges are located on the same side of this common normal line.

A critical factor in the construction of the illustrated apparatus is the distance "A" between ridges 18 and 20. Experiment has shown that when distance A is 47/64 inch, an observer positioned 100 of his own paces from a conventional seven foot golf flagstick can simultaneously align the lowermost visible portion of the flagstick with lower ridge 20, and the uppermost portion of the stick with upper ridge 18.

Turning now to FIG. 2, the geometry involved in the use of the apparatus is shown in diagrammatic form. In FIG. 2 the proportionate distances between the observer, the apparatus and the flagstick have been distorted for purposes of illustration.

In use, an observer holds apparatus 10 at arm's length and in such a position that lower ridge 20 is aligned directly between the observer's eye 22 and the lowermost visible portions of a golf flagstick 24. At this juncture it should be explained that while most golf flagsticks in common use are actually seven feet long, they are conventionally supported by placing them in a suitable receptacle at the bottom of the hole on a golf green such that the lowermost six inches of the golf flagstick cannot be seen. Thus, the visible portion of most golf flagsticks will be almost exactly 6½ feet.

When the observer is 100 of his own paces distant from the flagstick 24 and the lower ridge 20 aligned with the bottom of the flagstick, the upper ridge 18 of apparatus 10 will align with the uppermost tip of the flagstick. It is crucial to note that the observer determines a relative rather than an absolute distance from the flagstick, that is, a distance equal to a fixed number of his own paces.

It has been determined that 100 paces is an advantageous relative distance for several reasons. Firstly, most individuals are well capable of rapidly developing an understanding of a distance expressed in a constant number of their own paces. Also, a "feel" or understanding of such a distance may easily be developed merely by walking off a fixed number of paces to a distant object. This can be done at any convenient time without the need for any measuring apparatus to verify the distance traversed. In this manner, an individual may easily relate his activities, such as the force to be applied to a golf ball, to a distance he subjectively "knows" to be 100 of his own paces. Finally, 100 is a convenient number to use should it be desired to estimate the distance through interpolation or proportioning, as will be discussed presently.

The inventor has found that with the disclosed apparatus practically any individual, including children, can readily determine when they are 100 of their own paces from a flagstick. This is so because of a surprisingly consistent arm-to-leg length ratio which gives rise to a consistent arm length-to-pace ratio for both adults and children. Thus, an individual of relatively small stature will take a much shorter pace than an unusually tall person; however, the smaller person will have a proportionately shorter arm reach. The apparatus will thus be held proportionately closer to the eye of the diminutive user, so that he must approach flagstick 24 more closely in order that the extremities of the flagstick align with upper and lower ridges 18 and 20.

FIG. 3 depicts a particular advantage attributable to the unique configuration of the apparatus, wherein the upper and lower ridges of the apparatus are depicted as being blurred. This corresponds to the out-of-focus condition of the ridges as seen by an observer who is focusing his eye upon a distant flagstick 24. It will be understood by those skilled in optics and related arts that, as the ambient brightness of a field of vision increases the pupil of the eye becomes smaller. In consequence, the effective depth of visual field increases so that objects at differing distances may be brought into relatively good focus. Similarly, when ambient light is relatively low the pupil enlarges and the depth of the field becomes shallower with the result that objects at different distances from the one focused on appear increasingly blurry.

This "blurring" effect apparently poses a substantial obstacle to the accurate alignment of ridges on a nearby object with the extemities of a distant one. However, the inventor has found that by using ridges located on corresponding sides of opaque projections, the ridges facing in the same direction, the "blurring" effect is substantially cancelled. This surprising advantage is believed to arise due to the fact that, however an observer tends to misalign lower ridge 20 due to its blurred outline, he will tend to make a similar error in the alignment of upper ridge 18. In this manner the errors made will substantially cancel since, for instance, if one has a tendency to align the lowermost visible portion of the flagstick 24 with the upper edge of the blurred field above ridge 20, he will tend to make a corresponding alignment between the uppermost end of the flagstick and the upper edge of the blurred field above ridge 18.

Returning now to FIG. 1, it will be noted that projections 14 and 16 are shown as having at the bottomside edges thereof another pair of straight, parallel ridges denoted 28 and 30, respectively. The distance between ridges 28 and 30, denoted "B" in the Figure, is intended to correspond with the apparent height of an 8 foot golf flagstick when held at arm's length by an observer who is standing just 100 paces from the flagstick. The inventor has found that a dimension B of 54/64 inch achieves this purpose. In order to readily ascertain which of the ridges are to be used for a particular flagstick, designations such as those shown at 32 and 34 of FIG. 1 may be provided. The numeral indicated at 32 is the number "7"; this indicates that, when a 7 foot flagstick is to be referenced, the inventive apparatus is held in the position shown, the flagstick being aligned with ridges 18 and 20. The numeral "8" indicated at 34 and shown in dotted form is printed at the reverse side of the apparatus. When used in conjunction with an 8 foot flagstick the apparatus is then inverted so that the numeral 8 is seen by the user in which case ridges 30 and 28 would then be topside, essentially assuming the positions held by ridges 18, 20 in the Figure. In this manner, a useful apparatus is formed which may be used for estimating relative distances to either a seven or an 8 foot flagstick.

While in the first instance the distinguishing of a 7 from an 8-foot flagstick presents a substantial problem, in actual practice this has been found not to be the case. By far the most common flagstick in use is the 7 foot type, the longer 8 foot stick being used primarily when the shorter flagstick is likely to be obscured by a natural object or by the terrain. Further, inquiry may be made of golf course personnel by a player upon arrival at the course to ascertain which of the flagsticks are of the 8 foot variety. Aside from this it is possible, by using the disclosed apparatus, to independently ascertain which size of flagstick is present. In order to accomplish this a user simply approaches a distant flagstick, periodically holding apparatus 10 at arm's length and comparing one of the dimensions, for instance dimension A, with the apparent height of a distant flagstick until some predetermined relationship is established. For instance, one might approach a distant flagstick until dimension A, when viewed at arm's length, is just twice the apparent height of the flagstick. When this relationship is established, if the flagstick in view is assumed to be of the 7 foot type one is assumed to be 200 paces therefrom so that an advance of 100 paces will bring the apparent height of the distant flagstick into precise correspondence with dimension A. If this proves to be the case then the assumed 7 foot height of the flagstick is confirmed. However, should the flagstick have been of the 8 foot dimension, after advancing 100 paces its apparent height will be substantially less than dimension A. This is because, when the flagstick height was originally equated to one-half of dimension A, the higher flagstick would have been substantially further than 200 paces from the user. Therefore, after advancing 100 paces the user will in fact have advanced substantially less than one half of the total distance. Accordingly, the apparent height of the flagstick will not have been caused to double. It should be recognized that other distances and proportions may be selected for use in accordance with the foregoing description, the approach set forth above being only one example.

FIG. 4 represents an embodiment of the invention similar to that depicted in FIG. 1. The body 31 is formed of a suitable, substantially opaque material such as wood or plastic. A pair of projections 33, 35 extend from one side of the body in the same manner as projections 14 and 16 of FIG. 1 extended from body 12 to define pairs of ridges which lie upon the same side of a termination locus comprising a line perpendicular to the ridges.

Those ridges presently considered to be topside are spaced by a dimension A which, as previously stated, is 47/64 inch. The bottomside ridges are spaced by the 54/64 inch dimension referred to hereinabove. In addition the thickness of body 31 varies substantially uniformly from one end to the other to provide a tapered cross section. Approximately midway up the body is a transverse groove 37.

The embodiment of FIG. 4 can thus be used in the manner described with respect to FIG. 1 for estimating the distance in paces to either a 7 or 8-foot flagstick. However, due to its overall configuration a further advantage inheres. The tapered length of the body in conjunction with the transverse groove allows the device to be removably wedged beneath a flexible wire retainer so that it may be placed in a secure but easily accessible location. This attribute is quite important since the device is usually of such small dimensions that it can easily be dropped and lost. The inventor has found that a convenient manner of securing the device is simply to fasten a safety pin through an article of apparel at an easily accessible point, then to insert the inventive device between the elongate side members of the pin until one side member lodges in groove 37. The elasticity of the pin then retains the device in the manner of a detent. The device can easily be removed from the pin by applying pressure to the small end thereof to force the groove from beneath the engaged portion of the pin.

Turning now to FIG. 5, there is shown another presently preferred embodiment of the present invention which may be formed, for example, from a pair of coaxially aligned golf tees. Such a device can be constructed by drilling the upper or head portion 36 of a first tee 38 as shown by the dotted outline, and inserting therein an upper member comprised of a second tee 40 which may advantageously be split into sections 42, 44. By shortening the shank of upper element 40 to an appropriate length, dimension A is established between a first ridge formed by the elevational profile of the top of tee 38, and a second ridge formed by the elevational profile of segment 44 of upper tee 40. Similarly, dimension B may be generated by properly adjusting the other segment 42 of upper tee 40 such that its elevational profile forms a ridge substantially parallel to and properly spaced from the upper edge of lower tee 38. The configuration shown in FIG. 5 has the advantage of nominal expense, and further offers a pleasing appearance suggestive of the sport in which it is intended to be used. Still further, the lowermost shank section 46 of tee 38 is well adapted to be easily grasped by a user and moreover forms an appendage which may be retained by a clip or other means to the apparel of the wearer.

Figure 6:
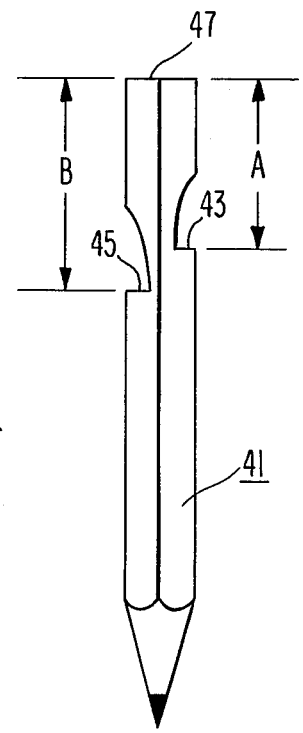
FIG. 6 illustrates an embodiment of the invention in a form similar to FIG. 5.

FIG. 6 depicts an embodiment similar in nature to the embodiment of FIG. 5. A pencil 41 such as commonly used by a golfer for marking his score card is notched in the manner shown. Each notch 43, 45 defines a ridge which is substantially parallel to the top of the pencil 47. In this manner notch 43 operates in conjunction with the end of the pencil to form a pair of parallel ridges which terminate along a common, vertical line and are separated by dimension A. Notch 45, which may conveniently be formed at the opposite side of the pencil, defines another ridge which is separated from the pencil end by dimension B. The lower portion of the pencil, forms a convenient means for grasping it when in use. As set forth above, dimensions A and B must be 47/64 and 54/64 inch, respectively. While the Figure depicts a hexagonal pencil it will be appreciated that a round cross section would serve as well. In addition, it should be recognized that the configuration shown is not limited to pencils and the like but is adaptable to any elongate rod-like element.

FIG. 7 illustrates in schematic form some basic relations in the use of the inventive apparatus. It includes five selected views of what the user sees in making use of the inventive apparatus. The outlines of ridges 18 and 20 are shown in juxtaposition with the flagstick in each view and the large number under each view is the distance to the flagstick in paces. In the view on the left, it is apparent that the observed height of the distant flagstick is one-half of the distance between ridges 18 and 20. The small number under the view is not ½ but is 2/1 (which is the reciprocal of ½) and which is the ratio of the apparent distance between the ridges to the apparent height of the flagstick. It is this ratio 2/1 which is multiplied by 100 of the user's paces and which tells the user that he is 2/1 × 100 paces = 200 paces from the flagstick.

Similarly, for the second view the flagstick occupies 4/5 of the distance between the ridges but the ratio of the distance between the ridges to the height of the flagstick is 5/4 and is so marked in small numbers under the view. This tells the user he is 5/4 × 100 paces or 125 paces from the flagstick. The second view is so marked in large numbers. Finally, in the view at the rightward side of the illustration wherein the apparent height of the flagstick is five times the height of the inter-ridge dimension, the distance to the flagstick is 1/5 × 100 paces or 20 paces.

As a user approaches a flagstick he sees the five views in a left to right sequence, therefore the five views have been spaced horizontally on a linear scale with zero paces at the right, in order to better illustrate some basic relations involved.

An examination of FIG. 7 will reveal that the heights of the flagsticks "grow" in nonlinear fashion with respect to the inter-ridge dimension. In fact, the change in the apparent height of the flagstick with respect to the inter-ridge dimension which occurs as a user advances approximates a rectangular hyperbola. Although a hyperbola is a rather sophisticated mathematical form, the user of the inventive apparatus nonetheless has little difficulty in estimating distance through the use of simple proportioning as has been described above. The reason for this ease of adaptation involves complex mental processes, and is probably attributable to the brain's adaptive ability. One relatively straightforward explanation of this almost intuitive "simplifying" ability lies in the apparent ability of the mind to transpose from one graphical system to another.

Figure 8:
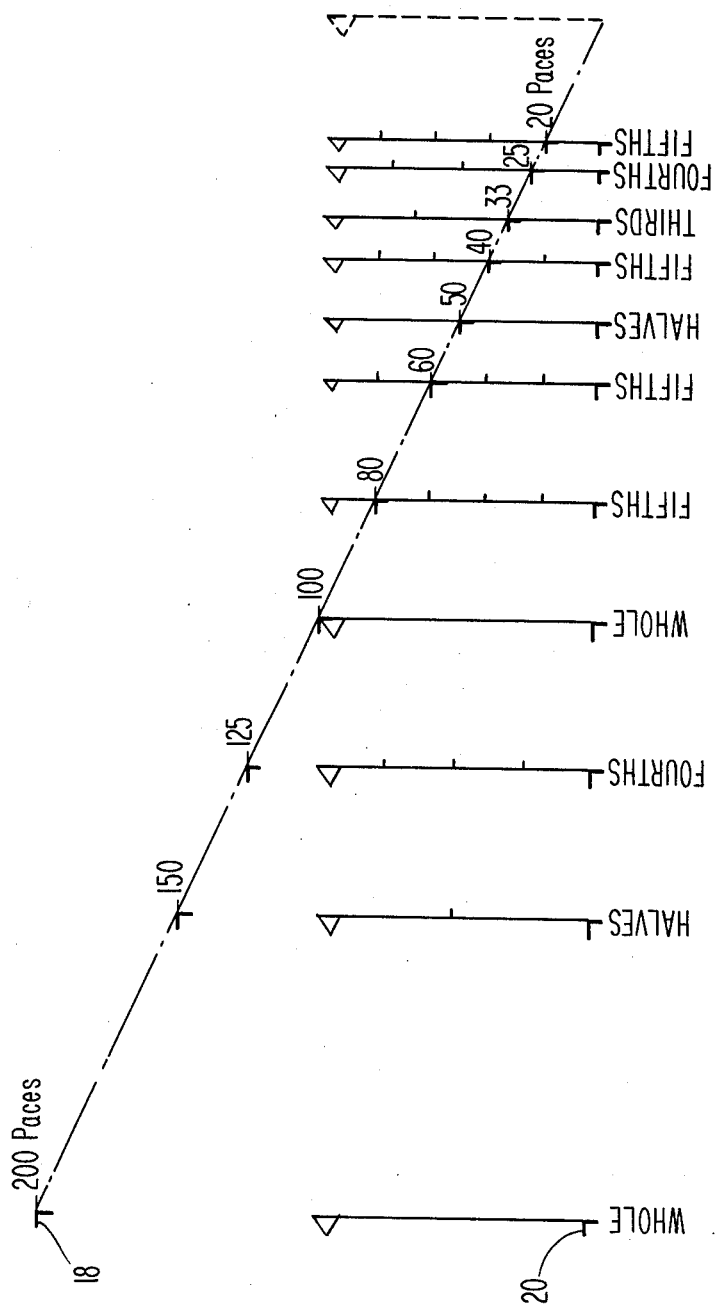
FIG. 8 is a graphical representation useful in explaining the operation of a preferred embodiment.

FIG. 8 sets forth an illustration which is thought to be representative of the transposition carried on within the mind of a user of the present invention and which enables him to use the invention with facility. It may be noted that all of the data that was used for FIG. 7 is also used for FIG. 8. The flagsticks in FIG. 8 are also arranged horizontally on a linear scale in paces with zero paces at the right. In FIG. 7 each view is scaled to show the inter-ridge distance constant but in FIG. 8 each view is scaled to show the flagstick height constant. The basic relations prescribe the ratio of interridge distance to flagstick height and it may be noted that for each view in FIG. 8 which uses the same data as used for a view in FIG. 7 the ratio is the same. The apparatus has been made of such dimensions that in the mind of the user, a flagstick is representative of a constant distance equaling 100 of his paces. As this dimension is conceptually constant, the height of the various flagsticks are scaled to be constant in FIG. 8. For FIG. 8 therefore we have established a vertical scale in paces for each view and this scale is the same for all views. On this scale the upper ridge 18 of the apparatus indicates the distance to the flagstick, since the lower ridge 20 has been aligned with the visible base of the flagstick. Since FIG. 8 has been drawn with flagsticks spaced horizontally on a linear scale in paces it is not surprising that the locations of ridge 18 in the several views should fall on a straight line and such a line as been drawn in FIG. 8.

It is interesting to note that the eleven views shown in FIG. 8 use simple ratios involving no number greater than five. What FIG. 8 also shows in the linear relation between the apparent inter-ridge distance and the distance to the flagstick, once the user gets the proper understanding of the invention. With a linear system, interpolation is so simple that it is generally accomplished without conscious effort.

It will now be seen that there has been disclosed herein a simple, readily formed device which is well adapted for use in the game of golf, and which provides an observer with a frame of reference which can be immediately related to a distance with which he is familiar, that is, one hundred of his own paces. This is achieved for the vast majority of individuals, both adults and children, through the use of a device having a common dimension for all users and which is formed to overcome errors arising from misfocusing of the eyes of the user.

As will be evident from the foregoing description, certain aspects of the invention are not limited to the particular details of the examples illustrated, and it is therefore contemplated that other modifications or applications will occur to those skilled in the art. It is accordingly intended that the appended claims shall cover all such modifications and applications as do not depart from the true spirit and scope of the invention.

What is claimed as new and described to be secured by Letters Patent of the U.S. is:

1. Apparatus for estimating the number of a user's paces required to traverse the distance between the user and a standard golf course flagstick, comprising:
   a first annular element;
   a first, elongate stem depending downwardly from said first annular element and coaxial therewith;
   a second annular element having a diameter equal to said first annular element;
   a second, elongate stem depending downwardly from said second annular element and being substantially longer than said first elongate stem;
   said first annular element having an upper surface which is diametrically divided to form an elevational profile defining first and second straight, horizontal ridges;
   said second annular element having an upper surface forming an elevational profile defining a third straight, horizontal ridge and having an axial aperture centrally located therein;
   said first, elongate stem having a lower end firmly seated in said axial aperture;
   said first straight, horizontal ridge being disposed 47/64 inch above said third straight, horizontal ridge;
   said second straight, horizontal ridge being disposed 54/64 inch above said third straight, horizontal ridge;
   whereby a loss in visual definition of the ridges due to the proximity of the apparatus to the user's eye is compensated for to allow substantially consistent determination of the distance between ones of the ridges.

* * * * *